(12) United States Patent
Nishi et al.

(10) Patent No.: US 9,572,213 B2
(45) Date of Patent: Feb. 14, 2017

(54) ILLUMINATION LIGHT AND ILLUMINATION DEVICE

(71) Applicants: Ryohsuke Nishi, Kanagawa (JP); Taroh Shirai, Kanagawa (JP); Norihiro Yamamoto, Kanagawa (JP)

(72) Inventors: Ryohsuke Nishi, Kanagawa (JP); Taroh Shirai, Kanagawa (JP); Norihiro Yamamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/836,444

(22) Filed: Aug. 26, 2015

(65) Prior Publication Data

US 2016/0066376 A1 Mar. 3, 2016

(30) Foreign Application Priority Data

Sep. 1, 2014 (JP) .................................. 2014-177401

(51) Int. Cl.
*H05B 37/00* (2006.01)
*H05B 33/08* (2006.01)

(52) U.S. Cl.
CPC ............. *H05B 33/0815* (2013.01); *F21K 9/27* (2016.08); *Y02B 20/348* (2013.01); *Y02B 20/383* (2013.01)

(58) Field of Classification Search
CPC ................................ H05B 33/02; H05B 33/08
USPC ..... 315/209 R, 200 R, 312, 291, 185 R, 246
See application file for complete search history.

(56) References Cited

U.S. PATENT DOCUMENTS

| 8,779,679 | B2 | 7/2014 | Miyamichi | |
|---|---|---|---|---|
| 2010/0090604 | A1 | 4/2010 | Maruyama et al. | |
| 2012/0025729 | A1* | 2/2012 | Melanson | H05B 33/0815 315/224 |
| 2012/0181944 | A1* | 7/2012 | Jacobs | H05B 33/0815 315/224 |
| 2012/0212143 | A1* | 8/2012 | Esaki | H05B 33/089 315/192 |
| 2013/0187563 | A1* | 7/2013 | Sasai | H05B 33/0815 315/287 |
| 2013/0207571 | A1* | 8/2013 | Esaki | H05B 37/02 315/297 |
| 2014/0117853 | A1 | 5/2014 | Miyamichi | |

FOREIGN PATENT DOCUMENTS

| EP | 2375860 A2 | 10/2011 |
|---|---|---|
| JP | 2009-105016 | 5/2009 |
| JP | 2011-243331 | 12/2011 |

(Continued)

OTHER PUBLICATIONS

Feb. 2, 2016 European search report in connection with corresponding European patent Application No. 15182800.1.

*Primary Examiner* — Minh D A
(74) *Attorney, Agent, or Firm* — Cooper & Dunham LLP

(57) ABSTRACT

An illumination light includes: a bridge diode that performs full-wave rectification on an alternating-current signal; a switching converter that includes a switching device and that converts the alternating-current signal on which the full-wave rectification has been performed, into a direct-current signal; a controller that controls on/off timing of the switching device; and a semiconductor light emitting element that is connected to the switching converter and the controller and to which the direct-current signal is output.

8 Claims, 12 Drawing Sheets

(56) References Cited

FOREIGN PATENT DOCUMENTS

| | | |
|---|---|---|
| JP | 5266594 | 5/2013 |
| JP | 2014-056729 | 3/2014 |
| WO | WO2013/005751 A1 | 1/2013 |

* cited by examiner

ILLUMINATION LIGHT AND ILLUMINATION DEVICE

CROSS-REFERENCE TO RELATED APPLICATIONS

The present application claims priority to and incorporates by reference the entire contents of Japanese Patent Application No. 2014-177401 filed in Japan on Sep. 1, 2014.

BACKGROUND OF THE INVENTION

1. Field of the Invention

The present invention relates to an illumination light and an illumination device.

2. Description of the Related Art

An illumination light that is capable of performing a lighting operation by being connected to an inverter ballast (a light fitting in a broad sense) for turning on a fluorescent light without any change has been known. Examples of this kind of illumination light include an illumination light that uses a semiconductor light emitting element, such as a light emitting diode (LED) illumination light.

As LED illumination lights have higher luminance efficiency than that of fluorescent lights, they are capable of producing light equivalent to that of fluorescent lights at a lower power consumption compared to the fluorescent lights. However, if an LED illumination light is connected to a light fitting without any change in order to perform a lighting operation, the light fitting supplies, to the LED illumination light, the electric power equivalent to that in a case where a fluorescent light is connected, and therefore the power consumption that occurs in an LED load of the LED illumination light is more than necessary.

Therefore, a technique in which an inductance is connected to the LED load of such an LED illumination light (what is called, wiring-work free LED illumination light) so that a reactive power is generated in the LED illumination light and the power saving can be achieved is known (for example, Japanese Laid-open Patent Publication No. 2011-243331 and Japanese Patent No. 5266594).

However, according to the above-described technique, as the inductance is used to generate a reactive power, if a faulty operation, such as a power shutdown, occurs while the energy is stored in the inductance, a counter electromotive force (high voltage) is generated and there is a possibility that the light fitting, which is connected to the illumination light, is damaged.

In view of the above, there is a need to provide an illumination light and an illumination device with which the power saving can be achieved and the safety can be improved.

SUMMARY OF THE INVENTION

It is an object of the present invention to at least partially solve the problems in the conventional technology.

An illumination light includes: a bridge diode that performs full-wave rectification on an alternating-current signal; a switching converter that includes a switching device and that converts the alternating-current signal on which the full-wave rectification has been performed, into a direct-current signal; a controller that controls on/off timing of the switching device; and a semiconductor light emitting element that is connected to the switching converter and the controller and to which the direct-current signal is output.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A detailed explanation is given below, with reference to the attached drawings, of an embodiment of an illumination light and an illumination device according to the present invention.

Figure 1:
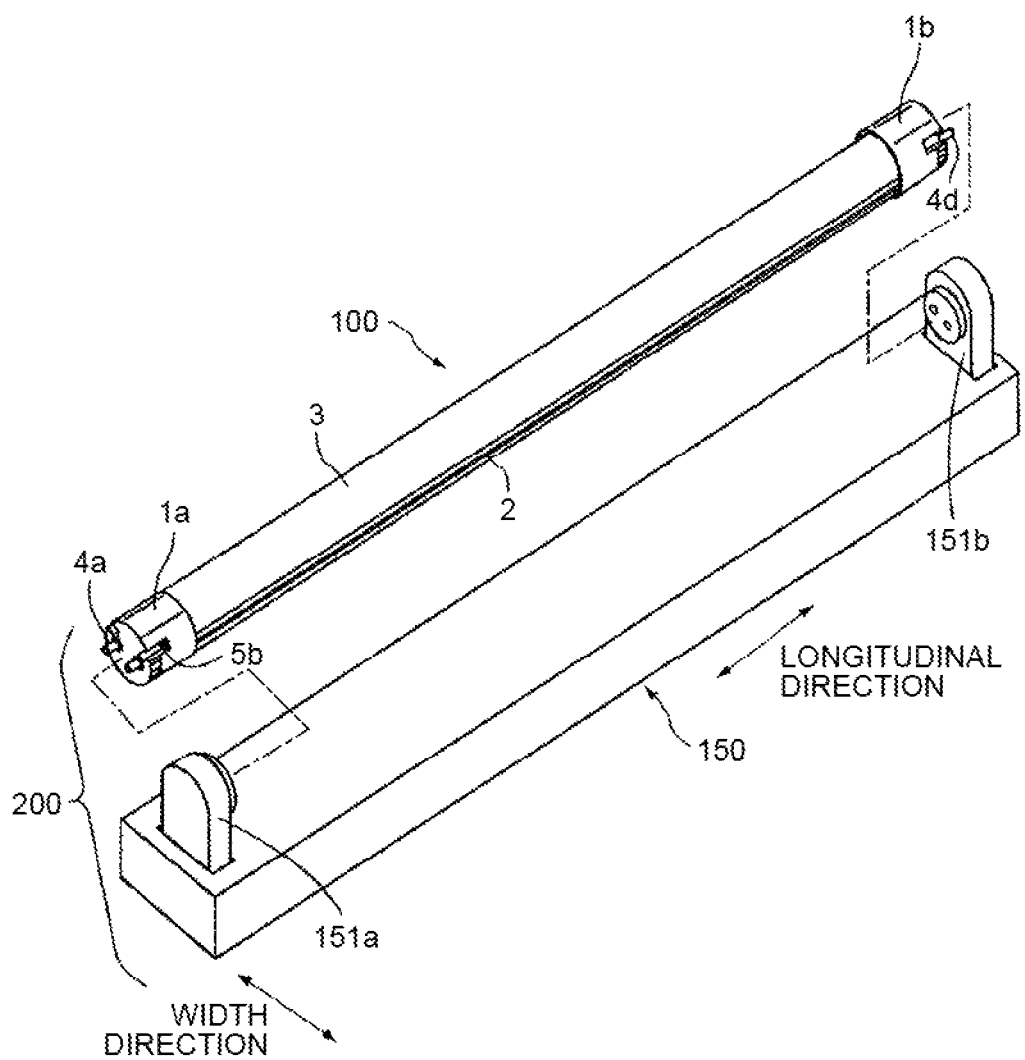
FIG. 1 is an external perspective view of a illumination device according to the present embodiment.

FIG. 1 is an external perspective view of an illumination device 200 according to the present embodiment. As illustrated in FIG. 1, the illumination device 200 includes an illumination light 100 and a light fitting 150 on which the illumination light 100 is mounted.

The illumination light 100 includes cap members 1a and 1b, a chassis 2, and a translucent member 3. The chassis 2 has an elongated shape that is formed by conducting extrusion molding on a metallic material, such as an aluminum alloy or a magnesium alloy. Furthermore, the chassis 2 is formed so as to have a substantially semi-cylindrical shape in cross-section. The translucent member 3 has en elongated and substantially semi-cylindrical shape as in the case of the chassis 2 so that the entirety has a substantially cylindrical shape when the translucent member 3 is combined with the chassis 2. Moreover, the translucent member 3 is made of a resin or glass so that it transmits light beams that are emitted by multiple LEDs that are described later.

The cap members 1a and 1b have a cylindrical shape with a bottom, and they serve as the caps for both ends of the chassis 2 and the translucent member 3. Furthermore, the cap members 1a and 1b are attached to sockets 151a and 151b of the light fitting 150 so that a physical and electrical connection is established between the light fitting 150 and the illumination light 100. Here, in this example, the chassis 2 has a substantially semi-cylindrical shape; however, a substantially semi-cylindrical shape does not need to be a limitation. In FIG. 1, the translucent member 3 is illustrated in a semicircle; however, a configuration may be such that the translucent member 3 has a cylindrical shape in cross-section like a fluorescent light and the translucent member 3 covers the chassis 2.

Figure 2:
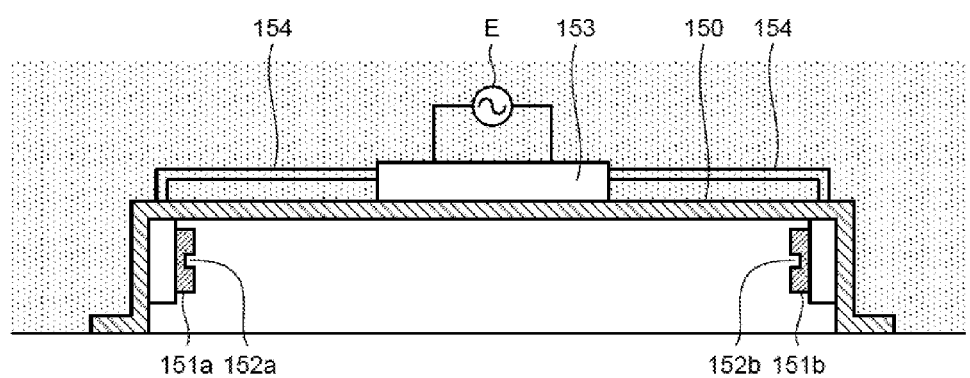
FIG. 2 is a cross-sectional view of a light fitting according to the present embodiment, taken along a longitudinal direction.

FIG. 2 is a cross-sectional view of the light fitting 150 according to the present embodiment, taken along a longitudinal direction. As illustrated in FIG. 2, the light fitting 150 includes a fluorescent light ballast 153 and the sockets 151a and 151b to which the illumination light 100 is removably attached, and is configured to be connected to a commercial power source E. The frequency of the commercial power source E is, example, 50 Hz or 60 Hz. The electric power from the commercial power source E is supplied to the fluorescent light ballast 153. As illustrated in FIG. 2, a side of the light fitting 150 opposite to the sockets 151a and 151b is embedded in, for example, the ceiling, and the side on which the sockets 151a and 151b are located is exposed. The sockets 151a and 151b are connected to the fluorescent light ballast 153 via a pair of electrode terminals 152a and 152b and wires 154.

The fluorescent light ballast 153 includes, for example, a fluorescent-light inverter ballast, a fluorescent-light glow ballast, or a fluorescent-light rapid ballast. In the present embodiment, an explanation is given of a case where, for example, the fluorescent light ballast 153 is a fluorescent-light inverter ballast; however, this is not a limitation.

However, the illumination light 100 is configured to be capable of being directly connected to a commercial alternating-current power source and, in this case, the fluorescent light ballast 153 is not needed. As described above, the illumination light 100 can be configured to be capable of being connected to any of a fluorescent-light glow ballast, a fluorescent-light rapid ballast, a fluorescent-light inverter ballast, and a commercial alternating-current power source.

Figure 3:
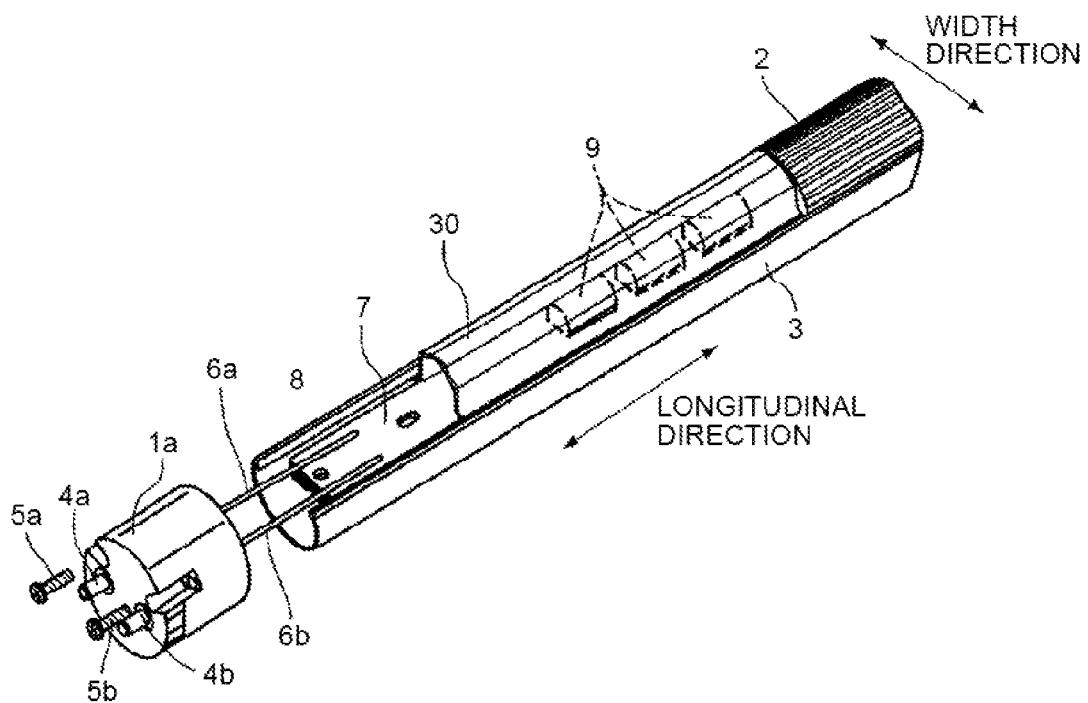
FIG. 3 is an exploded perspective view of the vicinity of the left-hand end of an illumination light with respect to a longitudinal direction according to the present embodiment.
Figure 4:
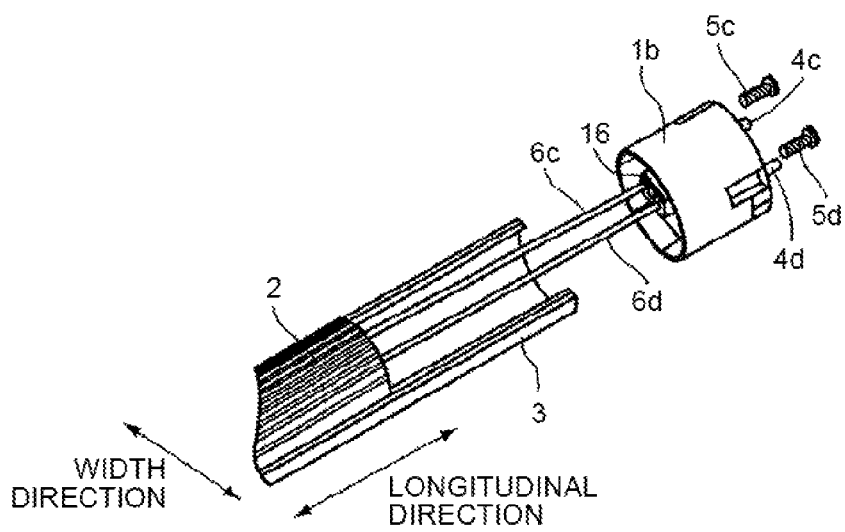
FIG. 4 is an exploded perspective view of the vicinity of the right-hand end of the illumination light with respect to a longitudinal direction according to the present embodiment.
Figure 5:
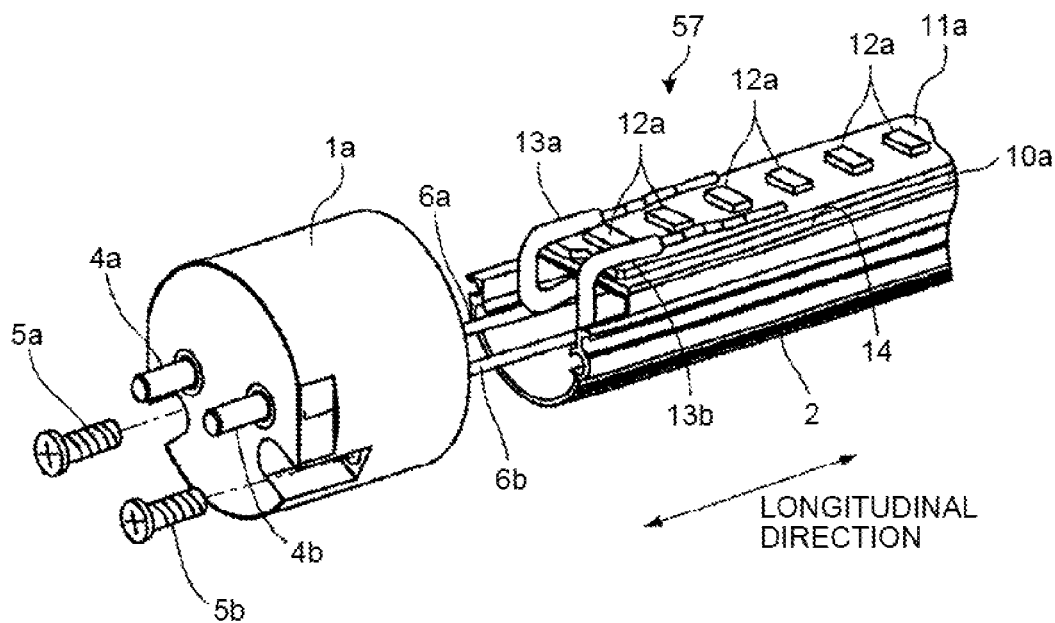
FIG. 5 is an exploded perspective view of the vicinity of the left-hand end of the illumination light with respect to a longitudinal direction according to the present embodiment.
Figure 6:
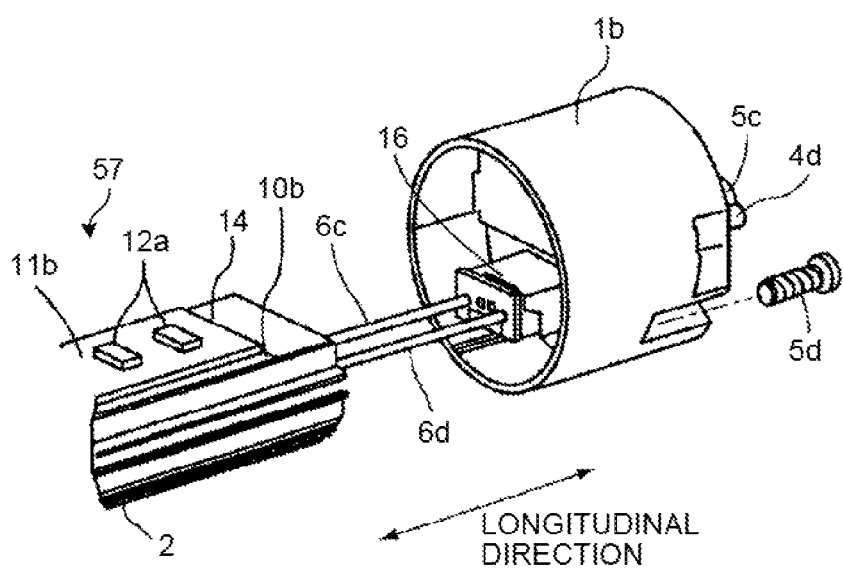
FIG. 6 is an exploded perspective view of the vicinity of the right-hand end of the illumination light with respect to a longitudinal direction according to the present embodiment.
Figure 7:
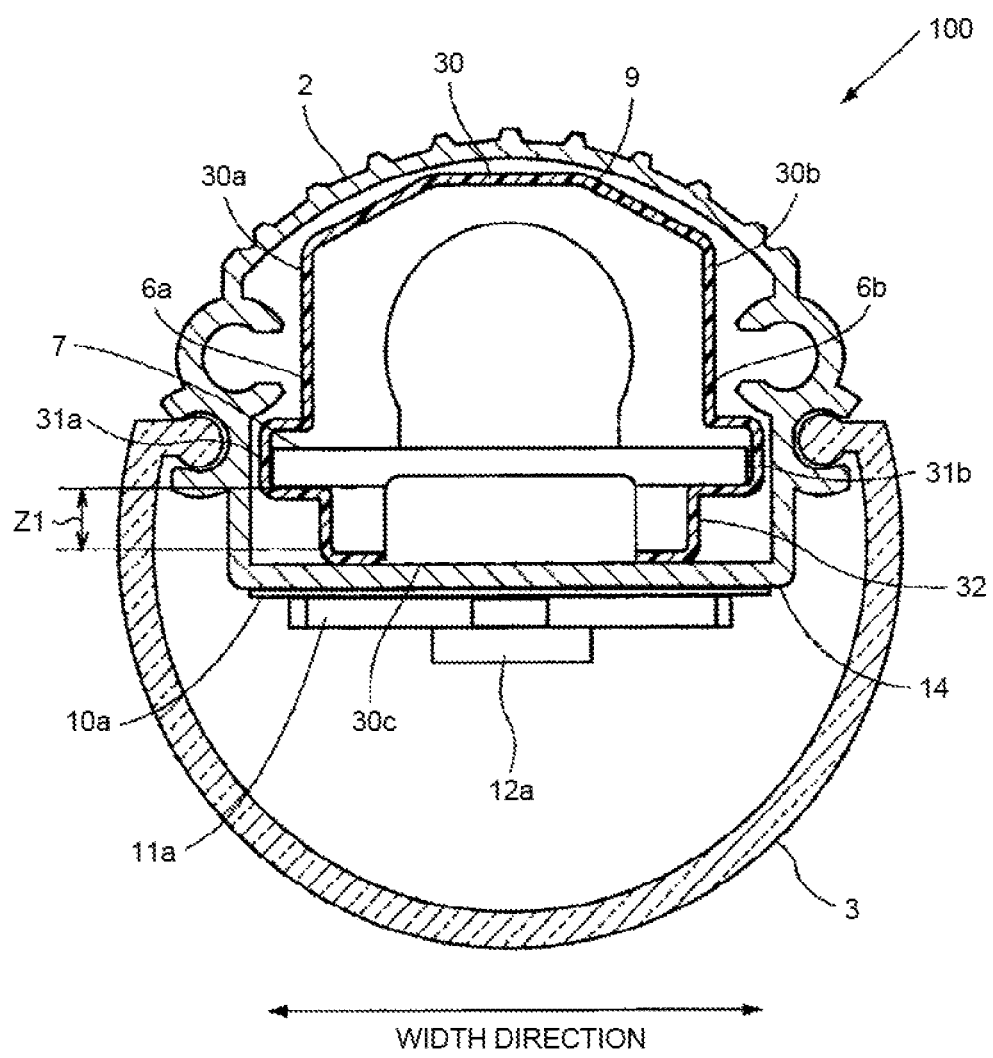
FIG. 7 is a cross-sectional view of the illumination light according to the present embodiment.

FIG. 3 and FIG. 5 are exploded perspective views of the vicinity of the left-hand end of the illumination light 100 with respect to a longitudinal direction according to the present embodiment, and FIG. 4 and FIG. 6 are exploded perspective views of the vicinity of the right-hand end of the illumination light 100 with respect to a longitudinal direction according to the present embodiment. FIG. 7 is a cross-sectional view of the illumination light 100 according to the present embodiment. Here, the illustration of a mounting board ha that is located above a power source board 7 is omitted in FIG. 3, and the mounting board 11a is illustrated in FIG. 5. Similarly, the illustration of a mounting board 11b is omitted in FIG. 4, and the mounting board 11b is illustrated in FIG. 6.

As illustrated in FIG. 3 and FIG. 4, the can members 1a and 1b are fixedly fastened to the chassis 2 with multiple screws 5a, 5b, 5c, and 5d. Thus, the cap members 1a and 1b cover the chassis 2 and the engaged translucent member 3 such that they are integrated with each other. That is, the cap members 1a and 1b are formed and provided such that they cover both ends of the chassis 2 and the translucent member 3.

The cap members 1a and 1b may not be fastened with the screws but they may be formed by applying tight adhesion (by swaging) at a joint line with the chassis 2 by using a tool, or the like, or may be formed by insert molding. The shape of the cap members 1a and 1b is almost the same as that of the cap member (ferrule) that is provided at both ends of the existing fluorescent light. The illumination light 100 can be easily replaced with the existing fluorescent light that is attached to the light fitting 150.

As illustrated in FIG. 3 to FIG. 6, terminals 4a and 4b are provided on the cap member 1a and electrode terminals 4c and 4d are provided on the cap member 1b such that they protrude from the cap member 1a and the cap member 1b in a longitudinal direction. To provide the electrode terminals 4a, 4b, 4c, and 4d on the can member 1a and the cap member 1b, a fixing technique, such as insert molding, swaging, or screw fastening, may be used. The illumination light 100 receives the alternating-current power from the commercial power source E via the light fitting 150, a connector 16 that is provided in each of the cap members 1a and 1b, and the like. The received alternating-current power is supplied to the power source board 7 illustrated in FIG. 3 via leads 6a, 6b, 6c, and 6d.

The power source board 7 is provided with a direct-current power conversion electronic component 5 for converting the obtained alternating-current power into a direct-current power and supplying it to the mounting boards 11a and 11b. As illustrated in FIG. 5 and FIG. 6, the mounting boards 11a and 11b are provided with a light emitting diode (LED) load 57 on which multiple LEDs 11a are mounted in a longitudinal direction. The LED is an example of a semiconductor light emitting element. As illustrated in FIG. 3, the power source board 7 is housed inside the chassis 2 that has a substantially semi-cylindrical shape, and it is fixed so as not to move within the chassis 2. Furthermore, in the case of the illumination device 200 according to the present embodiment, the leads 6a and 6b are shorter than the leads 6c and 6d.

After the current is rectified to a direct current by the electronic component 9, it is supplied to the mounting boards 11a and 11b via leads 13a and 13b that are illustrated in FIG. 5. The mounting boards 11a and 11b, which are arranged in parallel in a longitudinal direction, are electrically connected to each other by using an undepicted lead, jumper, or the like. Furthermore, in this example, the two mounting boards 11a and 11b are illustrated as the mounting boards on which the LED load 57 is mounted; however, one mounting board or three or more mounting boards may be provided.

As illustrated in FIG. 5 and FIG. 6, in the case of the illumination device 200 according to the present embodiment, the power source board 7 is provided under the mounting board 11a, and nothing is provided at the mounting board 11b. In other words, the configuration is made such that the inside of the chassis 2 is hollow and planar at the mounting board 11b. Furthermore, the mounting boards 11a and 11b are mounted on a plane part 14 corresponding to the chord of the semicircle of the chassis 2. Sheet-like resin members 10a and 10b are arranged between the plane part 14 and the mounting boards 11a and 11b such that they are sandwiched between the plane part 14 and the mounting boards 11a and 11b.

Both ends of the power source board 7 are connected to the leads 6a, 6b and the leads 6c, 6d as illustrated in FIG. 3 and FIG. 4, and the power source board 7 is surrounded by a resin holder 30 that is a cover member that extends in a longitudinal direction as illustrated in FIG. 7. The ends of the leads 6a and 6b and the ends of the leads 6c and 6d are provided with ferrule units to be inserted into the connectors 16. The holder 30 has an elongated shape and has a length that is equal to or greater than that of the power source board 7, and it is a cylindrical member that continues without any cut areas in cross-section. The holder 30 can be formed by using a molding method, such as extrusion molding, pultrusion molding, or injection molding. For example, polycarbonate (PC) or nylon (PA) is used as the material of the holder 30.

As illustrated in FIG. 7, the holder 30 can be accommodated inside the chassis 2, and has an almost uniform cross-sectional shape along a longitudinal direction. The power source board 7 is removably attached to the holder 30 so that it is integrated with the holder 30.

Specifically, as illustrated in FIG. 7, on side surfaces 30a and 30b that are positioned in the width direction that intersects with the longitudinal direction of the holder 30, rack sections 31a and 31b are formed so as to protrude in the width direction. The rack sections 31a and 31b serve as a guide rail section for inserting the power source board 7 into the holder 30 from the end. After the power source board 7 is inserted, the rack sections 31a and 31b support the power source board 7 such that a separation area (space area) 32 is formed between the power source board 7 and a bottom section 30c of the holder 30. The separation area 32 ensures a distance Z1 to prevent the electronic component 9's leads, which protrude from the power source board 7 as illustrated in FIG. 3, from being in contact with the holder 30 or to ensure the electric insulation properties.

The holder 30 covers the outside of the entirety (circumference) of the power source board 7 so that, inside the chassis 2, the power source board 7 is separated from the chassis 2. As illustrated in FIG. 7, in the chassis 2, the holder 30 is in contact with the inner surface of the chassis 2. In order to make the holder 30 easy to slide in the chassis 2, the front surface of the holder 30 that is in contact with the inner surface of the chassis 2 is a smooth surface. In this example, the holder 30 has a cross-sectional shape without any cut areas for dividing the holder 30. Therefore, to install the power source board 7 inside the holder 30, the power source board 7 is inserted into the holder 30 from the open end of the holder 30. The holder 30 and the power source board 7 are integrated with each other before they are attached to the chassis 2 so that they are configured as a power-source board unit, and it is inserted into the inside of the chassis 2 from the end of the chassis 2 while it is the power-source board unit.

With the above configuration, the resin holder 30 which separates the power source board 7 from the chassis 2, covers the circumference of the power source board 7, can be housed inside the chassis 2, and extends in a longitudinal direction while having the almost uniform cross-sectional shape, is provided, and whereby the electric insulation properties from the chassis 2 can be maintained, and a high level of safeness can be ensured. Furthermore, the inside of the chassis 2 does not need to be coated with an insulating material to ensure electric insulation properties; thus, the chassis 2 can be manufactured with low costs. Furthermore, the inside of the chassis 2 can be separated into sections for the power source board 7 and the chassis 2 by the holder 30; therefore, even if the leads 13a and 13b of the electronic component 9 protrude, they are prevented from being in contact with the chassis 2, and manufacture can be made without using an expensive component, such as a chip component.

Furthermore, in the case of the illumination device 200 according to the present embodiment, the holder 30 (the bottom section 30c of the holder 30) is provided between the power source board 7 and the mounting boards 11a and 11b; therefore, the heat of the power source board 7 is had to be conducted to the mounting boards 11a and 11b, and all the LEDs are evenly affected by the heat that is applied to the LED load 57. Thus, it is possible to prevent the inconvenience such that the operating life of the LEDs is partially decreased with time.

Furthermore, as the contact surface of the holder 30, which is integrated with the power source board 7, is smooth, the frictional resistance can be reduced, and the power-source board unit can be moved inside the chassis 2 in a smooth manner. Thus, it is possible to simplify an operation to fitting the connector 16 to the ferrule sections on both ends.

Furthermore, as the holder 30 is formed such that it continues without any cut areas in cross-section, the electronic component 9 is prevented from being in direct contact with the chassis 2, the electric insulation properties from the chassis 2 can be maintained, and a high level of safeness can be ensured. Furthermore, as coating does not need to be applied to the inside of the chassis 2 to ensure the electric insulation properties, the chassis 2 can be manufactured at low costs.

Figure 8:
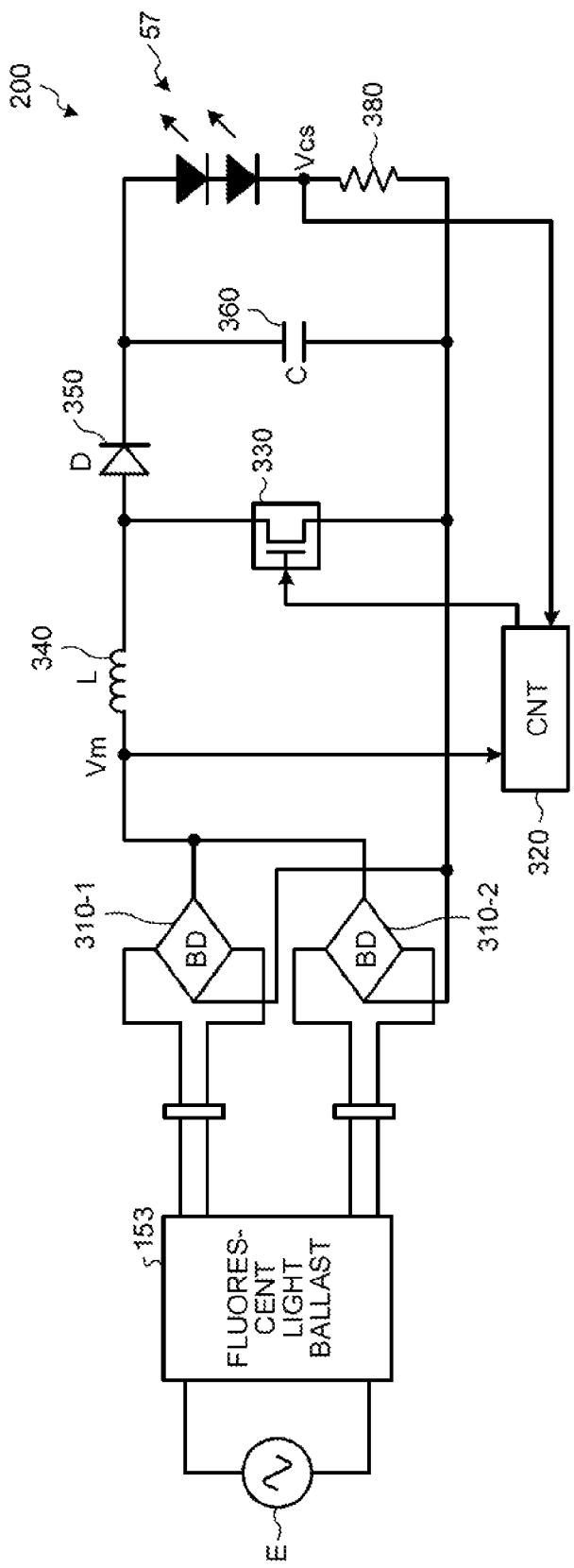
FIG. 8 is a circuit diagram of each circuit according to the present embodiment.

FIG. 8 is a circuit diagram of each circuit that is provided in the commercial power source E, the fluorescent light ballast 153, and the mounting boards 11a and 11b and the power source board 7 of the illumination light 100. As illustrated in FIG. 8, the illumination device 200 includes the commercial power source E, the fluorescent light ballast 153, bridge diodes (hereafter, referred to as the "BD") 310-1 and 310-2, a controller (hereafter, referred to as the "CNT") 320, a switching converter including an active switch (an example of a switching device) 330, an inductance (hereafter, referred to as the "L") 340, and a diode (hereinafter, referred to as the "D") 350, capacitance (hereafter, referred to as the "C") 360, the LED load 57, and a current sense resistor 380. Furthermore, the BDs 310-1 and 310-2, the CNT 320, the active switch 330, the L 340, the D 350, the C 360, the LED load 57, and the current sense resistor 380 are provided in any of the mounting boards 11a and 11b and the power source board 7 of the illumination light 100.

The BDs 310-1 and 310-2 perform full-wave rectification on an alternating-current signal that is supplied from the commercial power source E via the fluorescent light ballast 153.

The CNT 320 controls the on/off timing of the active switch 330. Specifically, the CNT 320 generates a gate signal for the active switch 330, outputs the generated gate signal to the active switch 330, and drives the active switch 330, thereby controlling the on/off timing of the active switch 330. Here, the CNT 320 controls the active switch 330 so as to turn it on at the timing that is different from the zero-cross timing of the alternating-current signal on which the full-wave rectification has been performed by the BDs 310-1 and 310-2 (in the example illustrated in FIG. 8, an alternating-current voltage Vm). It is noted that the waveform of the alternating-current voltage Vm is described later. Moreover, the details of the CNT 320 are described later.

The switching converter is a converter that converts the alternating-current signal (in the example illustrated in FIG. 8, the alternating-current voltage Vm), on which the full-wave rectification has been performed by the BDs 310-1 and 310-2, into a direct-current signal, and it is what is called an ACDC converter. Furthermore, according to the present embodiment, the switching converter is a booster-type converter, and the LED load 57 is connected to the L 340 and the D 350 in series and is connected to the active switch 330 in parallel.

The C 360 is a smoothing capacitor that is connected to the LED load 57 in parallel, and it removes alternating-current components that are included in the direct-current electricity that is output from the switching converter.

The LED load 57 is connected to the switching converter, and the direct-current signal that have been converted by the switching converter is output to the LED load 57. Specifically, the LED load 57 produces light when the switching converter applies the direct-current voltage to the LED load 57 and the direct current flow through the LED load 57.

The current sense resistor 380 is the resistor for detecting the current value of the current that flows through the LED load 57, and it outputs a terminal voltage Vcs to the CNT 320.

Figure 9:
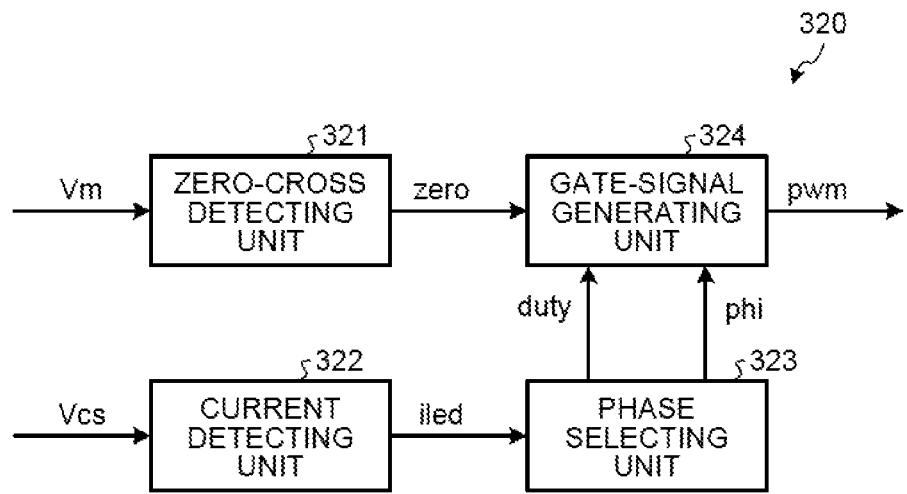
FIG. 9 is a block diagram that illustrates a configuration of a CNT according to the present embodiment.

FIG. 9 is a block diagram that illustrates an example of the configuration of the CNT 320. As illustrated in FIG. 9, the CNT 320 includes a zero-cross detecting unit 321, current detecting unit 322, a phase selecting unit 323, and a gate-signal generating unit 324.

The zero-cross detecting unit 321 detects the zero-cross timing of the alternating-current signal on which the full-wave rectification has been performed by the BDs 310-1 and 310-2 (in the example illustrated in FIG. 8, the alternating-current voltage Vm). Then, the zero-cross detecting unit 321 outputs, to the gate-signal generating unit 324, a zero signal that is high at the zero-cross timing and that is low when it is not at the zero-cross timing. Furthermore, the waveform of the zero signal is described later. The zero-cross detecting unit 321 includes, for example, a comparator.

The current detecting unit 322 detects a current value lied of the current that flows through the LED load 57. Specifically, the current detecting unit 322 performs an AD conversion on the terminal voltage Vcs that is output from the current sense resistor 380, detects the current value iled of the current that flows through the LED load 57 on the basis of the voltage on which the AD conversion has been performed, and the resistance value of the current sense resistor 380, and outputs it to the phase selecting unit 323. It is noted that the resistance value of the current sense resistor 380 is known by the current detecting unit 322. The current detecting unit 327 includes, for example, an AD converter and a division circuit.

On the basis of the current value iled that is detected by the current detecting unit 322, the phase selecting unit 323 selects a phase phi from the zero-cross timing, with which the current flowing through the LED load 57 becomes the target current. Then, the phase selecting unit 323 outputs the selected phase phi to the gate-signal generating unit 324. It is noted that the details of selection of the phase phi are described later.

Furthermore, the phase selecting unit 323 outputs, to the gate-signal generating unit 324, a duty signal that indicates the duty ratio (an example of a predetermined duty ratio) of a gate signal of the active switch 330.

Here, the duty ratio of the gate signal of the active switch 330 is typically set such that the output voltage of the switching converter becomes the target voltage. However, it is assumed that the illumination light 100 according to the present embodiment is connected (attached) to various types of the fluorescent light ballasts 153. With respect to all the fluorescent light ballasts 153, the values of the alternating-current voltages that are output from the fluorescent light ballasts 153 are not the same, but they are different depending on the type of the fluorescent light ballast 153. Therefore, regardless of the type of the fluorescent light ballast 153, the duty ratio cannot be set such that the output voltage of the switching converter becomes the target voltage.

Therefore, according to the present embodiment, a control to set the output voltage of the switching converter to the target voltage is not performed, but the duty ratio is set to a fixed value. The fixed value includes, for example, 50%. This is because it is preferable to ensure the amount of reactive power that is generated by the switching converter. However, the duty ratio is not limited to 50%, but it may be a different value.

On the basis of the zero-cross timing that is detected by the zero-cross detecting unit 321, the phase that is selected by the phase selecting unit 323, and the duty ratio from the phase selecting unit 323, the gate-signal generating unit 324 generates a gate signal and controls the on/off timing of the active switch 330 in accordance with the gate signal.

According to the present embodiment, the gate signal is a pulse width modulation (PWM) signal that is switched from low to high at the timing that is shifted by the specified phase from the zero-cross timing, and afterward it is switched between low and high in accordance with the duty ratio. It is noted that the gate-signal generating unit 324 calculates the cycle of the zero signal and sets the frequency of a PWM signal. Thus, the PWM signal can be synchronized with the zero signal. Furthermore, the waveform of the PWM signal is described later.

Here, an explanation is given of selection of the phase phi in detail. First, the phase selecting unit 323 sequentially sets different phases in the gate-signal generating unit 324, and the gate-signal generating unit 324 sequentially generates gate signals with different phases and outputs them to the active switch 330. Next, the current detecting unit 322 detects the current value of the current that flows through the LED load 57 for each of the generated gate signals, and the phase selecting unit 323 selects the phase of the gate signal with which the current value that is closest to the target current among the detected current values is achieved.

Figure 10:
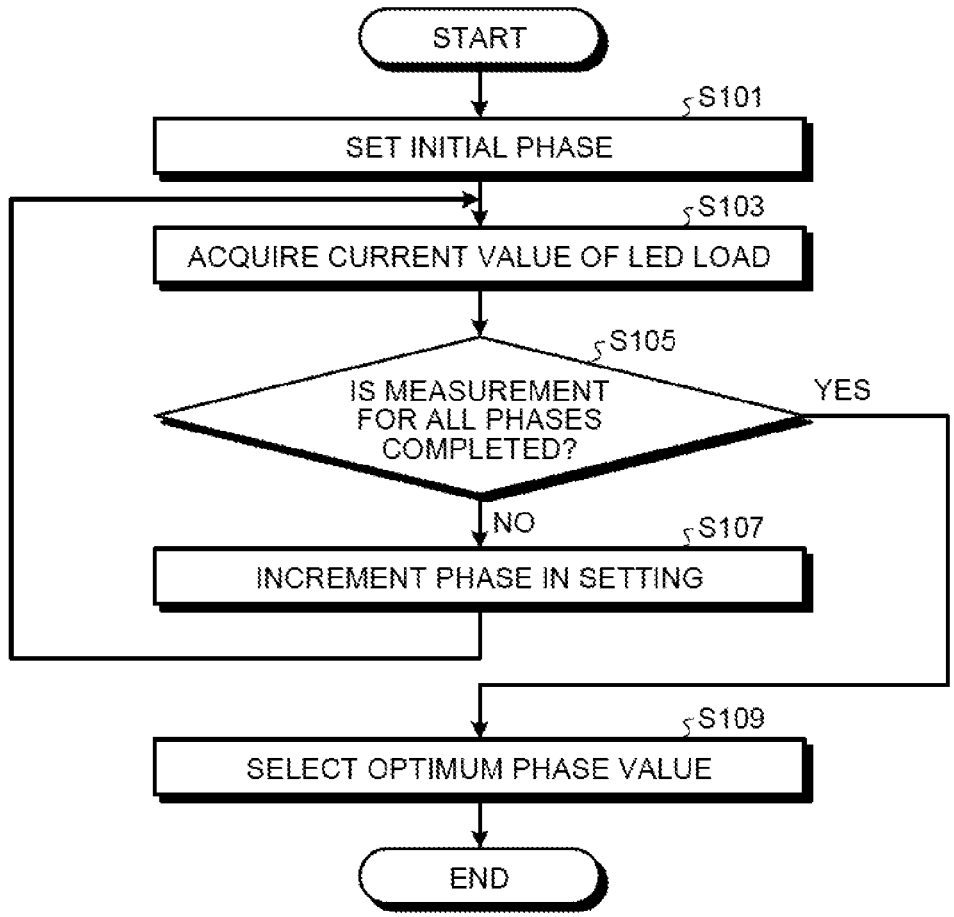
FIG. 10 is a flowchart that illustrates an example of a phase selection operation according to the present embodiment.

FIG. 10 is a flowchart that illustrates an example of a phase selection operation.

First, the phase selecting unit 323 sets the initial phase (Step S101), and the gate-signal generating unit 324 generates a gate signal with the initial phase and outputs it to the active switch 330.

Next, the current detecting unit 322 detects the current value of the current that flows through the LED load 57 in accordance with the output of the gate signal to the active switch 330 (Step S103).

It the measurement for all the phases is not completed (No at Step S105), the phase selecting unit 323 increments the phase in the setting and sets it (Step S107), and the gate-signal generating unit 324 generates the gate signal with the incremented phase and outputs it to the active switch 330. Then, the processing returns to Step S103.

Figure 11:
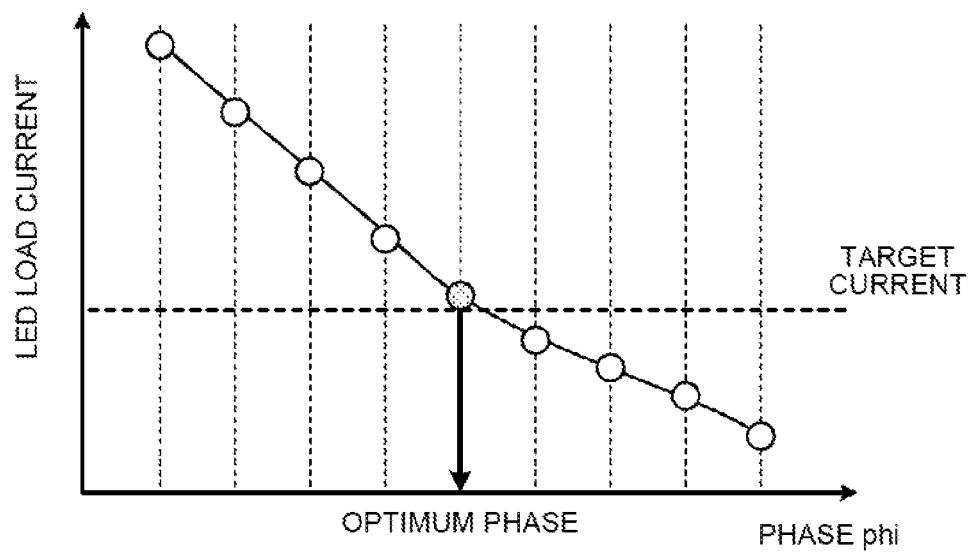
FIG. 11 is a graph that illustrates the relationship between the phase and the current value according to the present embodiment.

Furthermore, it the measurement of all the phases is completed (Yes at Step S105), the relationship between the phase and the value of the current that flows through the LED load 57 is obtained as illustrated in FIG. 11, and therefore the optimum phase value with which the current value is closest to the target current is selected (Step S109).

Here, the method for controlling the output waveform of the fluorescent light ballast 153 includes a constant-current control method, a constant apparent-power control method, a constant effective-power control method, or the like; and, according to the constant effective-power control method, when a reactive power is generated, an excess current is output, which is not assumed for the ballast, and there is a possibility that the malfunction or breakdown of the fluorescent light ballast 153 is caused.

Therefore, the phase selecting unit 323 selects zero as the phase if multiple current values, which are detected by the current detecting unit 322, are identical. This is because, when the current value of the current flowing through the LED load 57 is not changed even though the phase is changed, the fluorescent light ballast 153 uses a constant effective-power control method, and therefore the power saving effect cannot be achieved by changing the phase, and there is a possibility that the malfunction or breakdown of the fluorescent light ballast 153 is caused.

Figure 12:
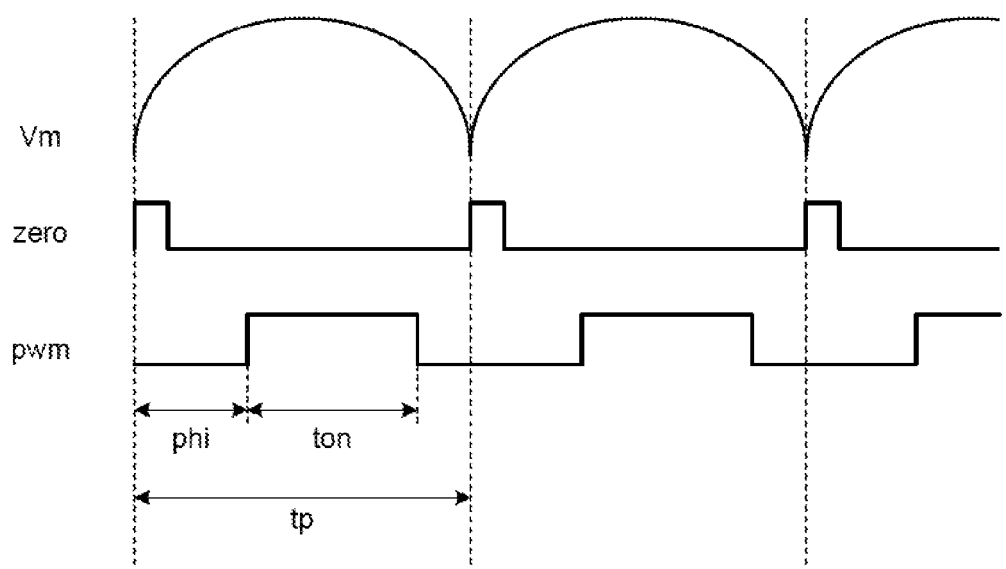
FIG. 12 is a diagram that illustrates an example of the waveforms of signals according to the present embodiment.

FIG. 12 is a diagram that illustrates an example of the waveforms of the alternating-current voltage Vm, the zero signal, and the PWM signal. Here, ton of the PWM signal indicates the period during which the PWM signal is on, i.e., high, and tp indicates one cycle of the PWM signal.

Figure 13:
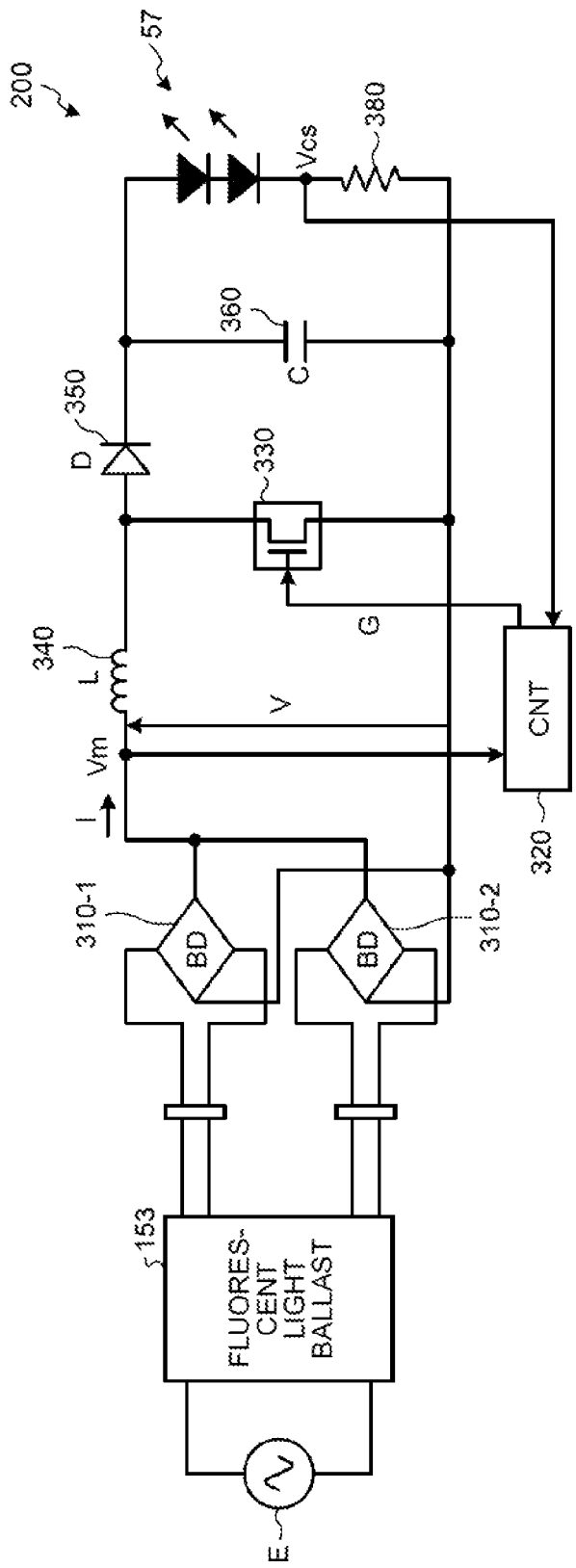
FIG. 13 is a diagram that illustrates an advantage of the present embodiment.
Figure 14:
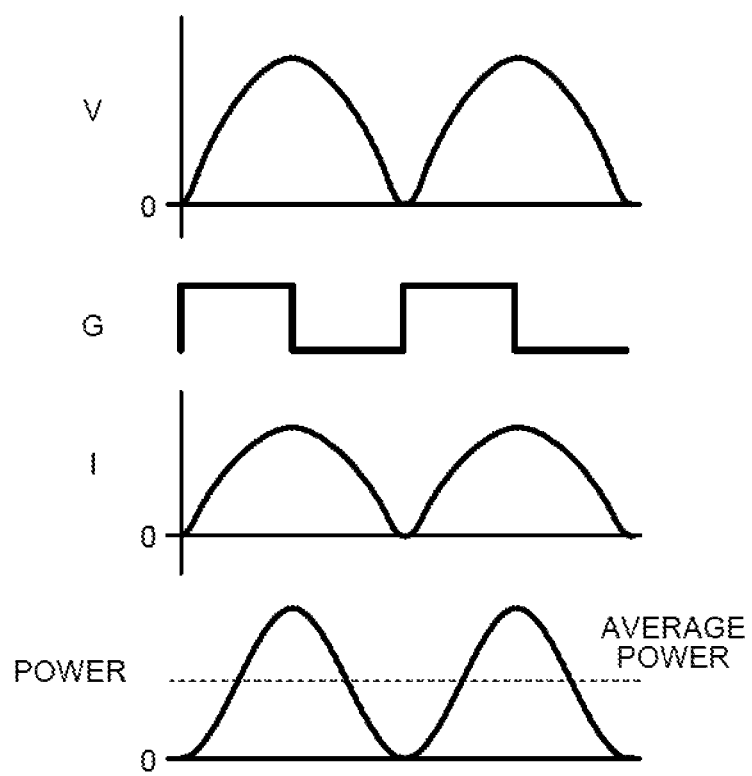
FIG. 14 is a diagram that illustrates an advantage of the present embodiment in comparison with a conventional example.
Figure 15:
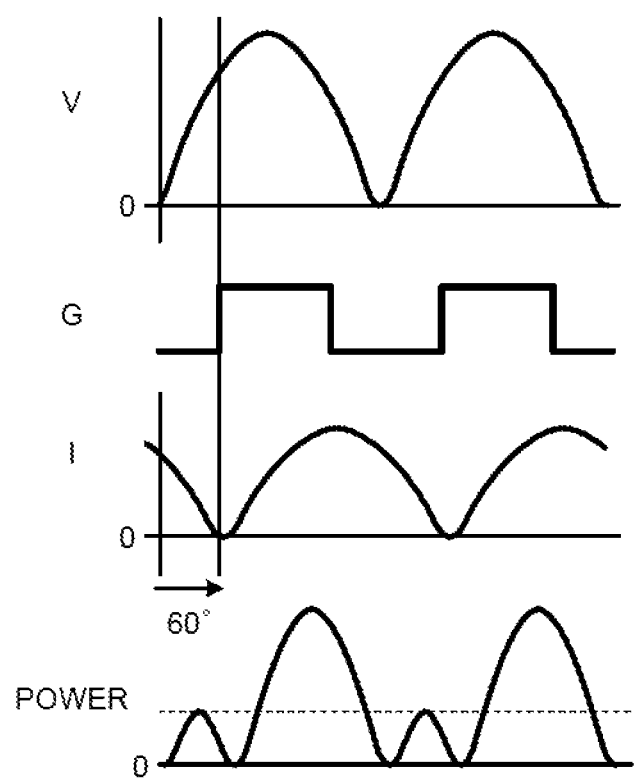
FIG. 15 is a diagram that illustrates an advantage of the present embodiment.

With reference to FIG. 13 to FIG. 15, an advantage of the present embodiment is explained. FIG. 14 is a diagram that illustrates an example of an input voltage V of the switching converter, a gate signal G, an input current I, and a power in a case where the phase control according to the present embodiment is not performed, i.e., in a conventional example, and FIG. 15 is a diagram that illustrates an example of the input voltage V of the switching converter, the gate signal G, the input current I, and the power in a case where the phase control according to the present embodiment is performed. Furthermore, in FIG. 15, the phase is delayed by 60° from the zero-cross timing. Furthermore, FIG. 13 illustrates where the input voltage V, the gate signal G, and the input current I are at.

As it is obvious from the comparison between FIG. 14 and FIG. 15, as the phase control is performed to generate a reactive power, the average power in FIG. 15 is smaller than that in FIG. 14. As a result, the power consumption that is consumed by the LED load 57 after it is output from the switching converter in FIG. 15 is also smaller than that in FIG. 14, and thus the power saving effect can be achieved.

According to the present embodiment as described above, a reactive power is generated by using an active switch instead of an inductance; thus, the occurrence of a counter electromotive force can be prevented, and the safeness can be improved as well as power saving can be achieved.

Furthermore, according to the present embodiment, even if various types of fluorescent light ballasts are connected, a sufficient amount of reactive power can be generated by changing the phase. Therefore, the power saving can be achieved without taking measures, such as selectively connecting multiple inductances or multiple capacitors to an LED load, whereby low costs and small mounting areas can be achieved.

Furthermore, according to the present embodiment, if a constant effective-power control method, or the like, is used, and therefore the power saving effect cannot be achieved by changing the phase and there is a possibility that the malfunction or breakdown of the fluorescent light ballast is caused, the phase is not shifted; thus the safeness can be further improved.

Modified Example

In the above-described embodiment, an explanation is given of, for example, a case where the switching converter is of a booster type; however, the switching converter may be of a step-down type.

Figure 16:
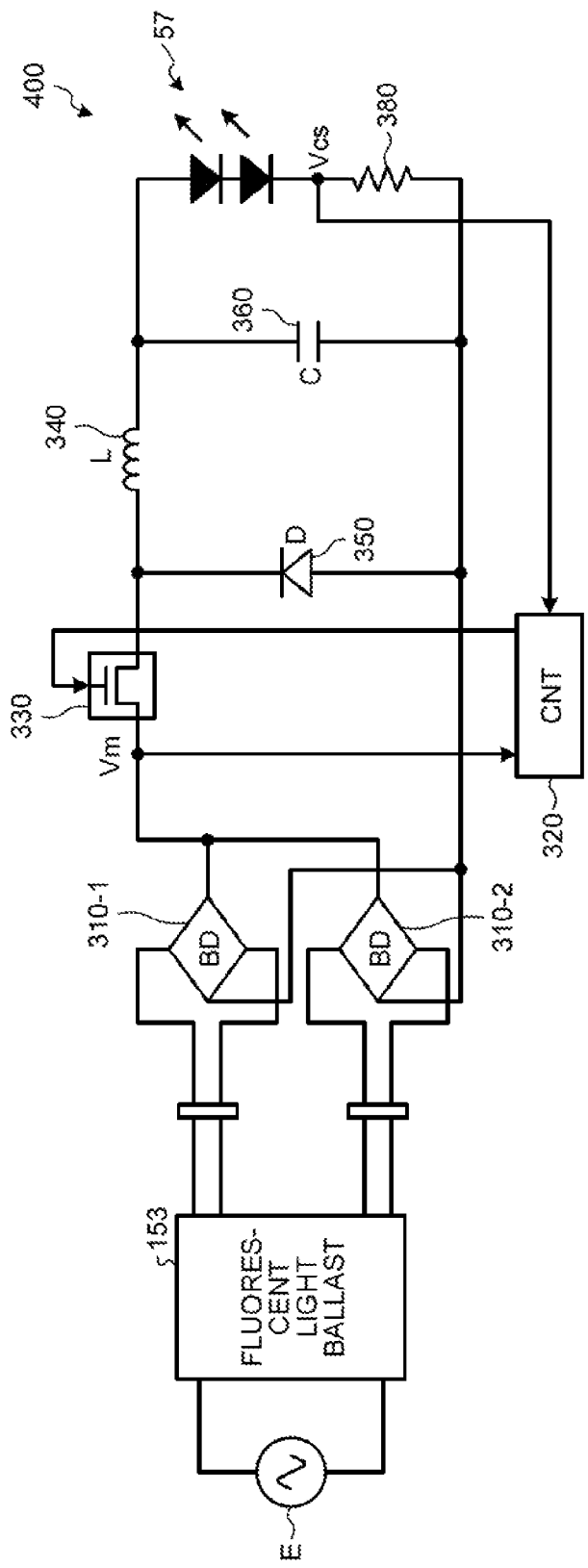
FIG. 16 is a circuit diagram of each circuit according to a modified example.

FIG. 16 is a circuit diagram of each circuit that is provided in the commercial power source E, the fluorescent light ballast 153, and the mounting boards 11a and 11b and the power source board 7 of the illumination light 100 according to a modified example. In an illumination device 400 that is illustrated in FIG. 16, a switching converter is a step-down type converter, and the LED load 57 is connected to the active switch 330 and the L 340 in series and is connected to the D 350 in parallel.

According to an embodiment, it is possible to provide the advantage that the power saving can be achieved and the safety can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An illumination light comprising:
    a bridge diode that performs full-wave rectification on an alternating-current signal;
    a switching converter that includes a switching device and that converts the alternating-current signal on which the full-wave rectification has been performed, into a direct-current signal;
    a controller that controls on/off timing of the switching device; and
    a semiconductor light emitting element that is connected to the switching converter and the controller and to which the direct-current signal is output,
    wherein the controller includes
        a zero-cross detecting unit that detects a zero-cross timing of the alternating-current signal on which the full-wave rectification has been performed;
        a current-value detecting unit that detects a current value of a current that flows through the semiconductor light emitting element;
        a phase selecting unit that selects, in accordance with the detected current value, a phase from the zero-cross timing with which a current flowing through the semiconductor light emitting element becomes a target current, and outputs (i) the selected phase and (ii) a duty signal that indicates a duty ratio; and
        a gate-signal generating unit that (i) generates a gate signal in accordance with the zero-cross timing, the selected phase selected by the phase selecting unit, and the duty ratio indicated by the duty signal received from the phase selecting unit and that (ii) controls on/off timing of the switching device in accordance with the gate signal.

2. The illumination light according to claim 1, wherein the controller performs control to turn on the switching device at a timing that is different from a zero-cross timing of the alternating-current signal on which the full-wave rectification has been performed.

3. The illumination light according to claim 1, wherein the gate signal is a pulse width modulation (PWM) signal that is switched from low to high at a timing that is shifted by the selected phase from the zero-cross timing and that is afterward switched between low and high in accordance with the predetermined duty ratio.

4. The illumination light according to claim 1, wherein
the gate-signal generating unit sequentially generates gate signals with different phases,
the current-value detecting unit detects a current value of a current that flows through the semiconductor light emitting element for each of the gate signals, and
the phase selecting unit selects a phase of a gate signal with which a current value is closest to the target current among the detected current values.

5. The illumination light according to claim 4, wherein the phase selecting unit selects zero as the phase if the detected current values are identical.

6. The illumination light according to claim 1, wherein the switching converter is of a booster type.

7. The illumination light according to claim 1, wherein the switching converter is of a step-down type.

8. An illumination device comprising:
the illumination light according to claim 1; and
a light fitting to which the illumination light is connected.

* * * * *